US008995651B1

(12) United States Patent
Lee et al.

(10) Patent No.: US 8,995,651 B1
(45) Date of Patent: Mar. 31, 2015

(54) MULTIPLE ALGORITHM CRYPTOGRAPHY SYSTEM

(75) Inventors: Sean Lee, Fremont, CA (US); Chang Shu, San Jose, CA (US); Fei Sun, Santa Clara, CA (US)

(73) Assignee: Marvell International Ltd., Hamilton (BM)

( * ) Notice: Subject to any disclaimer, the term of this patent is extended or adjusted under 35 U.S.C. 154(b) by 675 days.

(21) Appl. No.: 13/156,893

(22) Filed: Jun. 9, 2011

Related U.S. Application Data (60) Provisional application No. 61/354,099, filed on Jun. 11, 2010.

(51) Int. Cl.
*H04L 9/00* (2006.01)
*G06F 7/72* (2006.01)
*H04L 9/30* (2006.01)

(52) U.S. Cl.
CPC ............. *G06F 7/728* (2013.01); *H04L 9/302* (2013.01); *H04L 9/3066* (2013.01)
USPC .............................................. 380/30; 380/28

(58) Field of Classification Search
CPC ........... G06F 7/72; G06F 7/724; G06F 7/728; G06F 7/44; H04L 9/302; H04L 9/3066; H04L 9/30
USPC ...................................................... 380/30, 28
See application file for complete search history.

(56) References Cited

U.S. PATENT DOCUMENTS

| 6,085,210 | A  | * | 7/2000 | Buer ............................ 708/491 |
| 6,546,104 | B1 | * | 4/2003 | Shimbo et al. ................. 380/28 |
| 2004/0054705 | A1 | * | 3/2004 | Le Quere ...................... 708/491 |
| 2006/0023878 | A1 | * | 2/2006 | Son ................................ 380/28 |

OTHER PUBLICATIONS

Sudhakar et al., "New and Improved Architectures for Montgomery Modular Multiplication" Aug. 2007, pp. 281-291, http://link.springer.com/article/10.1007%2Fs11036-007-0019-z.*

Fan et al., "Montgomery Modular Multiplication Algorithm for Multi-core Systems" 2007, pp. 1-15 http://citeseerx.ist.psu.edu/viewdoc/download?doi=10.1.1.88.5108&rep=rep1&type=pdf.*

Jia-hong et al., "Hardware Implementation of Improved Montgomery's Modular Multiplication Algorithm" Jan. 2009, pp. 370-374, http://ieeexplore.ieee.org/stamp/stamp.jsp?tp=&arnumber=4797279&tag=1.*

Sudhakar et al., "New and Improved Architectures for Montgomery Modular Multiplication" Aug. 2007, pp. 281-291, http://link.springer.com/article/10.1007%2Fsl036-007-0019-z.*

(Continued)

*Primary Examiner* — Jung Kim
*Assistant Examiner* — Carlos M De Jesus Lassaia (57) ABSTRACT

A system includes an interface module, an addressing module, and a multiplier module. The interface module is configured to (i) receive operands and configuration data for a Rivest-Shamir-Adleman (RSA) operation or an Elliptic Curve Cryptography (ECC) operation, and (ii) control access to a random access memory (RAM). The addressing module is configured to allocate memory space within the RAM for storage of the operands. The multiplier module includes a Montgomery multiplier configured to perform Montgomery multiplication operation for both the RSA operation and the ECC operation.

19 Claims, 6 Drawing Sheets

(56) References Cited

OTHER PUBLICATIONS

Jia-hong et al., "Hardware Implementation of Improved Montgomery's Modular Multiplication Algorithm" Jan. 2009, pp. 370-374, http://ieeexplore.ieee.org/stamp/stamp.jsp?tp=&arnumber=4797279&tag= 1.*

Eberle et al., "A public-key Cryptographic Processor for RSA and ECC", 2004, pp. 1-13 http://citeseerx.ist.psu.edu/viewdoc/summary?doi=10.1.1.69.4988.*

Sudhakar et al., "New and Improved Architectures for Montgomery Modular Multiplication" Aug. 2007, pp. 281-291, http://link.springer.com/article/10.1007%2Fs1036-007-0019-z.*

Fan et al., "Montgomery Modular Multiplication Algorithm for Multi-core Systems" 2007, pp. 1-15 http://citeseerx.ist.psu.edu/viewdoc/download?doi=1 0.1.1.88.5108&rep=rep1 &type=pdf.*

Jia-hong et al., "Hardware Implementation of Improved Montgomery's Modular Multiplication Algorithm" Jan. 2009, pp. 370-374, http://ieeexplore.ieee.org/stamp/stamp.jsp?tp=&arnumber=4797279&tag= 1.*

Eberle et al., "A public-key Cryptographic Processor for RSA and ECC", 2004, pp. 1-13 http://citeseerx.ist.psu.edu/viewdoc/summary?doi= 10.1.1.69.4988.*

Tenca et al., "A Scalable Architecture for Modular Multiplication Based on Montgomery's Algorithm" Sep. 2003, pp. 1215-1221, http://cs.ucsb.edu/~koc/docs/j58.pdf.*

Satoh et al., "A Scalable Dual-Field Elliptic Curve Cryptgraphic Processor", Apr. 2003, pp. 449-460, http://ieeexplore.ieee.org/stamp/stamp.jsp?tp=&arnumber=1190586.*

Crowe et al., "A Scalable Dual Mode Arithmetic unit for Public Key Cryptosystem", Apr. 2006, pp. 1-6, http://ieeexplore.ieee.org/xpls/abs_all.jsp?arnumber=1428523.*

Daly et al., "Efficient Architectures for implementing Montgomery Modular Multiplication and RSA Modular Exponentiation on Reconfigurable Logic", Feb. 2002, pp. 1-10, http://www.cecs.uci.edu/~papers/compendium94-03/papers/2002/fpga02/pdffiles/2_2.pdf.*

Inventra et al., "MEX-PROC Modular Exponentiation Processor", Jul. 1998, pp. 1-2, http://www.cs.ucr.edu/~dalton/params/Data_sheets/mexproc_pd.pdf.*

\* cited by examiner

MULTIPLE ALGORITHM CRYPTOGRAPHY SYSTEM

CROSS-REFERENCE TO RELATED APPLICATIONS

This application claims the benefit of U.S. Provisional Application No. 61/354,099, filed on Jun. 11, 2010. The disclosure of the above application is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The present disclosure relates to public-key cryptography. Public-key cryptography is a cryptographic method based on the application of asymmetric key algorithms in which a key used to encrypt a message (the "public" key) is different than a key used to decrypt the message (the "private" key). For example, public-key cryptography may be used to generate digital signatures. In digital signatures, the sender's private key may be attached to the message prior to transmission. After receiving the message, the recipient may verify the authenticity of the message using the sender's public key.

SUMMARY

A system includes an interface module, an addressing module, and a multiplier module. The interface module is configured to (i) receive operands and configuration data for a Rivest-Shamir-Adleman (RSA) operation or an Elliptic Curve Cryptography (ECC) operation, and (ii) control access to a random access memory (RAM). The addressing module is configured to allocate memory space within the RAM for storage of the operands. The multiplier module includes a Montgomery multiplier configured to perform Montgomery multiplication operation for both the RSA operation and the ECC operation.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF DRAWINGS

The present disclosure will become more fully understood from the detailed description and the accompanying drawings, wherein.

DESCRIPTION

The following description is merely illustrative in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical OR. It should be understood that steps within a method may be executed in different order without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Two algorithms used in public-key cryptography are Rivest-Shamir-Adleman (RSA) and Elliptic Curve Cryptography (ECC). RSA involves the generation of public and private keys for encryption and decryption of messages. The public key may be known by everyone and is used to encrypt messages. The private key, however, is required to decode the encrypted message. For example only, the public and private keys may be generated as follows:

(1) Choose two distinct prime numbers (p, q);
(2) Compute n=p×q;
(3) Compute the totient of the product as $\phi(n)=(p-1)\times(q-1)$;
(4) Choose a number e between 1 and $\phi(n)$ that is co-prime to $\phi(n)$ but not a divisor of $\phi(n)$; and
(5) Compute the modular multiplicative inverse d=e×mod $\phi(n)$, The public key is represented by the pair (n, e) and the function to generate an encrypted message (c) using a message (m) is:

$$c = m^e \bmod(n) \quad (1).$$

The private key, on the other hand, is represented by the pair (n, d) and the function to decode the encrypted message c to determine the message m is:

$$m = c^d \bmod(n) \quad (2).$$

ECC is based on the algebraic structure of elliptic curves over finite fields. Specifically, one or more base points may be publicly-known but the equation representing the elliptic curve may be private. In other words, the assumption is that finding the discrete logarithm of a random elliptic curve element with respect to a publicly-known base point is infeasible thereby providing security. For example, the elliptic curve may be represented by the following plane curve equation:

$$Y^2 = X^3 + AX + B \quad (3),$$

where A and B are constants defining the elliptic curve and X and Y are points satisfying the elliptic curve equation (i.e., points along the elliptic curve).

Figure 1:
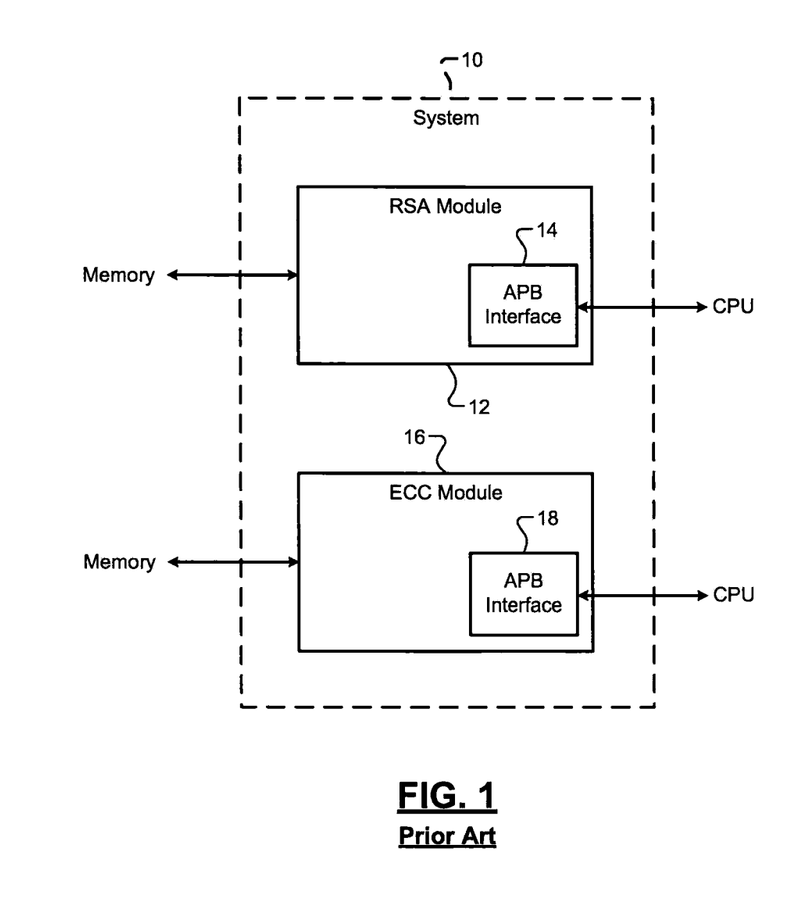
FIG. 1 is a functional block diagram of a cryptography system that includes independent RSA and ECC modules according to the prior art.

ECC may provide improved security compared to RSA in addition to having decreased storage and transmission requirements. ECC, however, may have a smaller throughput than a similarly sized RSA-based system. For example only, RSA may have a 1024-bit throughput while ECC may have a 521-bit throughput. Therefore, conventional public-key cryptography systems may include separate modules to execute RSA and ECC, respectively, as illustrated in FIG. 1. Specifically, a cryptography system 10 includes an RSA module 12 and an ECC module 16 having separate advanced peripheral bus (APB) interfaces 14 and 18, respectively. Implementing separate modules, however, increases design area which increases chip size and costs. Specifically, both RSA and ECC may use a Montgomery multiplier to perform multiplication operations. Montgomery multipliers, however, may account for approximately 70% of a cryptograph system's overall size.

While ECC involves more modular operations than RSA, both perform similar modular operations. Therefore, common elements among the RSA and ECC systems may be shared to decrease area and increase throughput. In addition, while RSA may have a much larger range of operand sizes compared to ECC, an address offset may be implemented to compensate for the different sized ranges. For example only, the range of operand sizes for RSA may be 32-bit to 2048-bit, whereas the operand sizes for ECC may be 234-bit, 256-bit, 384-bit, or 521-bit (i.e., a range of 234-bit to 521-bit). Furthermore, the combination RSA-ECC system may be scalable. The scalability provides for design flexibility by having different areas and/or throughputs.

Accordingly, a combination RSA-ECC cryptography system is presented. The combination RSA-ECC system may execute both RSA and ECC cryptography algorithms while decreasing total area. Specifically, the combination RSA-ECC system may achieve this by (i) shifting the storage of operands to an external random access memory (RAM) and (ii) sharing one Montgomery multiplier that performs multiplication operations for both RSA and ECC. Additionally, while the external RAM is increased in size, the RAM may be used by other components when RSA or ECC operations are not being executed (i.e., when the system is idle).

Figure 2:
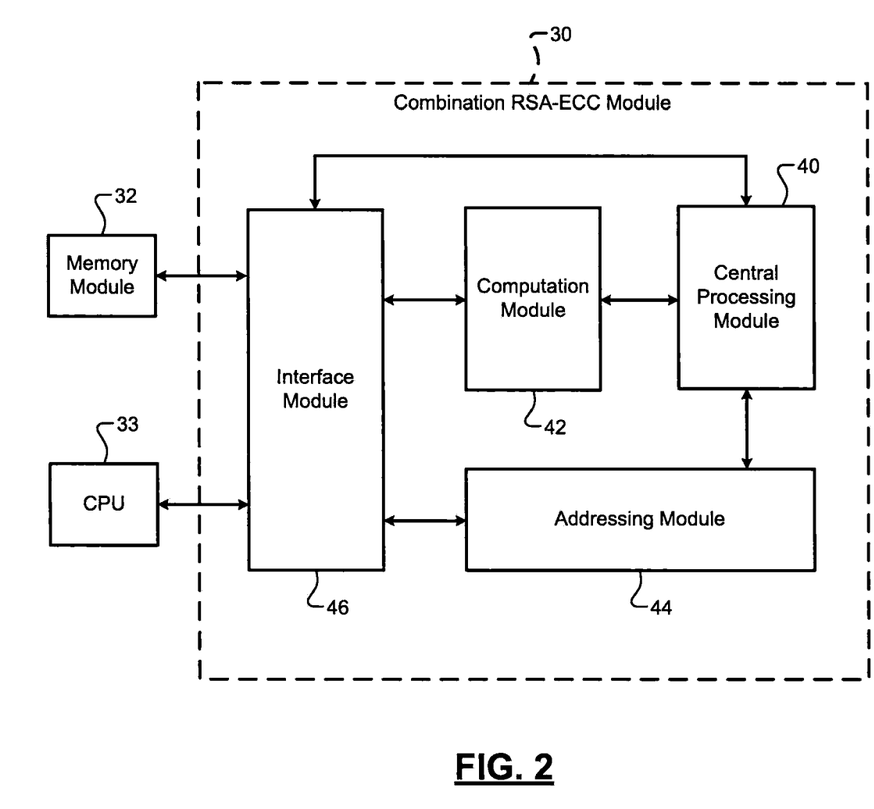
FIG. 2 is a functional block diagram of a combination RSA-ECC cryptography system according to one implementation of the present disclosure.

Referring now to FIG. 2, a combination RSA-ECC module 30 is shown. The combination RSA-ECC module 30 reads/writes a memory module 32. For example, the memory module 32 may be RAM. The combination RSA-ECC module 30 also receives input parameters from and outputs results to a central processing unit (CPU) 33 via an APB interface. The input parameters may be different for RSA than for ECC. The input parameters for RSA may be first and second operands X, Y and a prime M used in modular operations. Alternatively, the input parameters for ECC may be first and second constants A, B and first and second points along the curve ($P_1$[X, Y], $P_2$[X,Y]). The output of both RSA and ECC may be referred to as Z.

The combination RSA-ECC module 30 includes a central processing module 40, a computation module 42, an addressing module 44, and an interface module 46. The central processing module 40 executes operations of the combination RSA-ECC module 30. Specifically, the central processing module 40 may control the computation module 42 to execute desired operations. The addressing module 44 controls allocation of storage space within the RAM 32 and provides a way for CPU 33 to access the RAM 32. The interface module 46 controls communication between the combination RSA-ECC module 30 and external components (i.e., RAM 32 and CPU 33).

Figure 3:
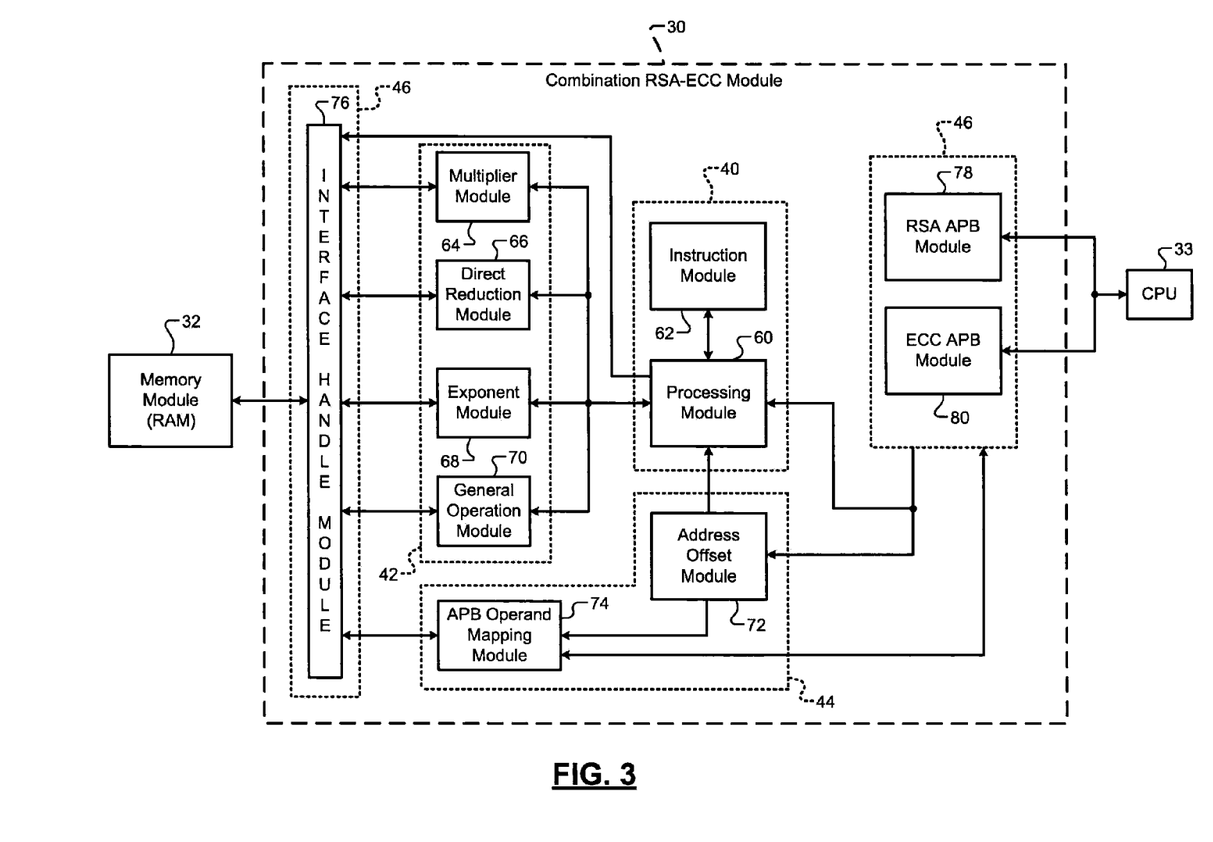
FIG. 3 is a functional block diagram of a combination RSA-ECC cryptography system according to another implementation of the present disclosure.

Referring now to FIG. 3, the combination RSA-ECC module 30 is shown in further detail. The central processing module 40 further includes a processing module 60 and an instruction module 62. The processing module 60 may also include an internal counter, a system flag, interface control logic, address mapping logic, configuration logic, and a state machine. The internal counter is used to control the looping behavior in the instruction sequence. The system flag represents a result of a comparison instruction and thus indicates whether or not a particular event has occurred. The interface control logic generates a select signal for the interface handle module 76 to assign the interface module 46 to one of the sub-modules of the computation module 42 and to APB oper- and mapping module 74, since there is only one interface module 46 and therefore only one module may read/write the RAM 32 at a given time. The address mapping logic maps the instruction memory space in the instruction module 62 to the memory space in the RAM 32 based on address information provided by address offset module 72. The configuration logic sets up configurations such as source and destination addresses of the computation module 42 based on the instruction. Lastly, the state machine decodes the instruction and executes an action accordingly (described in detail below and shown in FIG. 5).

The instruction module 62 includes instructions for all RSA and ECC operations. For example, the instruction module 62 may include read-only memory (ROM) that stores the instructions. Moreover, the instructions may be adaptively designed such that both RSA and ECC may be executed efficiently. The processing module 60 retrieves the instructions from the instruction module 62. The processing module 60 also includes a program counter (PC) that monitors the process flow. In other words, the PC identifies an instruction in instruction module 62 to be executed according to its (i.e., the PC's) value. For example, the PC may be a 9-bit register that indicates where the current instruction is in the instruction sequence. When an RSA or ECC operation begins, RSA APB module 78 or ECC APB module 80 sets the initial PC value.

As mentioned above, the instruction module 62 may include a plurality of different instructions. For example only, the instruction module 62 may include 26 different instructions (described in detail below). Each instruction may take 0 to 4 arguments depending on its functionality. For example, the size of an argument may vary from 4 to 12 bits depending on the instruction. Additionally, for example, the internal counter size may be 12 bits. The following argument notations are used below in detailing some exemplary instructions: S represents a source location (4-bits), D represents a destination location (4-bits), and C represents a constant integer value having a varying size dependent upon the instruction.

The instructions may include but are not limited to: (1) end and return to idle; (2) determine and store length of exponent operation and store to internal counter; (3) check exponent operand most-significant-bit (MSB) and set flag if zero; (4) compare exponent operand's MSB 2 bits after a 1-bit left shift and set flag if different; (5) set flag if internal counter value is zero; (6) decrement internal counter by one; (7) set internal counter to a constant (C); (8) shift exponent operand left by one bit; (9) unconditional jump to one of the RSA exponent operations according to the configuration; (10) jump to one of the ECC operations according to the configuration if flag is set to zero; (11) unconditional jump to current location plus C; (12) jump to current location plus C if flag is set; (13) jump to current location plus C if flag is not set; (14) perform $2^{33n/32}$ mod M and store results to D (direct reduction); (15) copy operand from S to D; (16) set operand at D to C; (17) modular addition of operands at source locations (S0 and S1) and store result to D; (18) modular subtraction of operands at S0 and S1 and store result to D; (19) Add operand at S with C and store result to D; (20) Subtract C from operand at S and store result to D; (21) Montgomery multiplication of operands at S0 and S1 and store result to D; (22) set flag if operand at S is zero; (23) unconditional jump to inverse function code and saved PC plus one value; (24) unconditional jump back to instruction next to function call instruction by restoring PC plus one value; (25) terminate task due to zero inverse error, return to idle and generate interrupt; (26) terminate task due to zero key error, return to idle and generate interrupt, and (27) unconditional terminate task.

The computation module 42 further includes a multiplier module 64, a direct reduction module 66, an exponent module 68, and a general operation module 70. All computation sub-modules have similar input/output interface: (1) a start signal input to activate the module; (2) a done signal output to indicate the task done; (3) a memory read/write interface; and (4) operands' source and destination address inputs. The multiplier module 64 performs multiplication operations. Specifically, the multiplier module 64 may include a Montgomery multiplier. Implementing a Montgomery multiplier may simplify design complexity thereby decreasing both area and timing. For example, the multiplier module 64 may perform the following operation:

$$XY \times 2^{-n} \bmod(M) \quad (4),$$

where X, Y, and M represent the operands and n is the bit size of the operands.

The direct reduction module 66 performs direct reduction operations. A pre-computation is required for converting operands from an ordinary domain to the Montgomery domain prior to Montgomery multiplication. The pre-computation is a reduction process:

$$R = 2^{2n} \bmod(M) \quad (5),$$

where M is the operand, n is the bit size of the operand, and R is the pre-computation result.

The pre-computation is simplified to include both a Montgomery multiplication and a direct reduction. The simplification reduces the exponent, 2n, in equation (5) to k, where k<2n. After the direct reduction module 66 computes $2^k$ mod (M), the result is fed to Montgomery multiplication to perform a self-multiplication. The multiplication continues until $2^{2n}$ mod(M) is reached. In one implementation, k is set to 33n/32.

Figure 4:
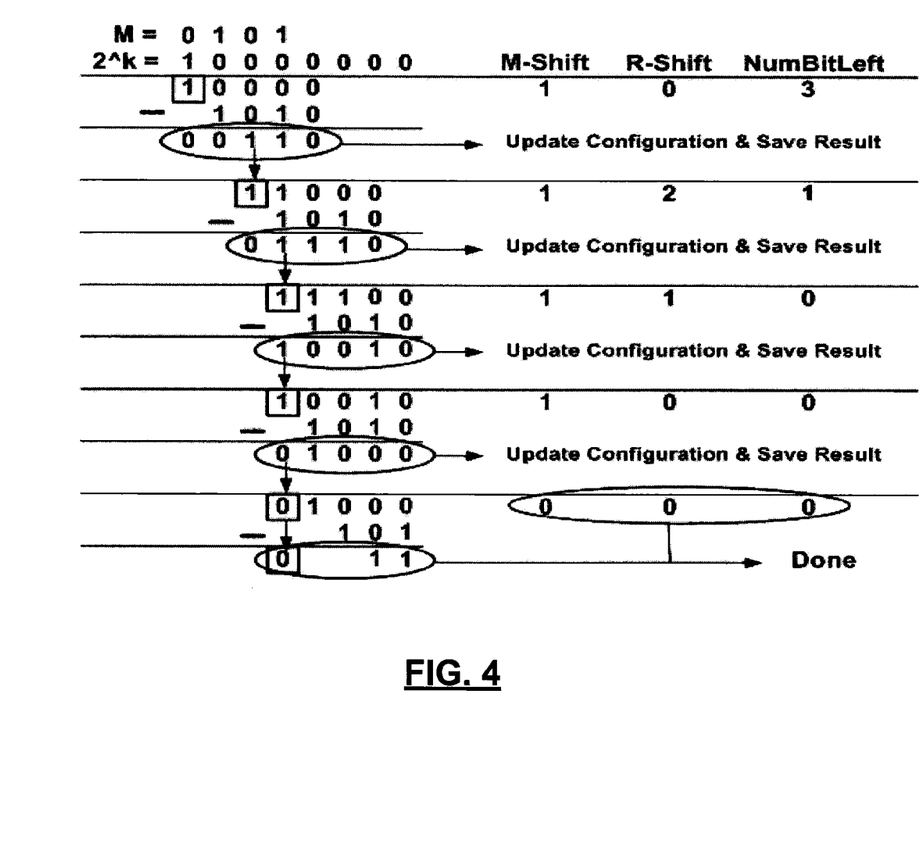
FIG. 4 is an illustration of an example direct reduction operation according to one implementation of the present disclosure.

For example only, FIG. 4 illustrates an example of a direct reduction operation (M=3, k=7). M-Shift represents a number of left-shift operations on M and R-Shift represents a number of left-shift operations on R. NumBitLeft represents a number of unprocessed bits. As shown, five iterations are performed until R<M.

Referring again to FIG. 3, the exponent module 68 provides information for modular inverse or modular exponentiation operations. Specifically, the exponent module 68 may determine the location of the leading one bit of the target operand by searching from the target operand's MSB to LSB. Once the leading one bit is found, the exponent module 68 returns the value of each individual bit to processing module 60 by a single-bit left-shift on the target operand upon request. In addition, the exponent module 68 may store the bit length of the target operand.

The general operation module 70 performs a variety of general operations. First, the general operation module 70 may perform modular addition or modular subtraction on two operands. In addition, the general operation module 70 may also perform constant addition or constant subtraction on one operand. The general operation module 70 may also set an operand to a constant or a predetermined value. Similarly, the general operation module 70 may determine whether an operand is zero. Lastly, the general operation module 70 may move an operant from one memory location to another. The general operation module 70, however, may also perform other general operations.

The addressing module 44 further includes the address offset module 72 and the APB operand mapping module 74. The address offset module 72 allocates an appropriate amount of space in the RAM 32 for different operations. The address offset module 72 generates a set of addresses according to the operand size. For example, when the operand size is 128 bits and the width of RAM 32 is 32 bits, the addresses returned from the address offset module 72 are a set of numbers which are multiple of 4 (includes zero). In order words, the address offset module 72 generates starting addresses of the operands. The processing module 60 uses the starting addresses to map instruction memory space in instruction module 62 to memory space in the RAM 32. Similarly, the APB operand mapping module 74 uses the starting addresses to map the APB memory space to the memory space in the RAM 32 in addition to various operand loading/unloading mechanisms.

The interface module 46 further includes the interface handle module 76, the RSA APB module 78, and the ECC APB module 80. The interface handle module 76 controls communication between the computation module 42 and the RAM 32. In addition, the interface handle module 76 may use the select signal generated by processing module 60 to assign the memory interface (to RAM 32) to one of the sub-modules in computation module 42 or the APB operand mapping module 74. Memory read/write signals and write data may be registered before leaving the combination RSA-ECC module 30. Similarly, the read data from RAM 32 may be registered before entering computation module 42 and addressing module 44.

The RSA APB module 78 and the ECC APB module 80, on the other hand, handle communication between the combination RSA-ECC module 30 and the CPU 33 according to APB protocol. The RSA APB module 78 and the ECC APB module 80 may include configuration registers that store configuration from the CPU 33 and status registers that report status to the CPU 33. In other words, the firmware may load configurations and/or operands to the combination RSA-ECC module 30 via the RSA APB module 78 or the ECC APB module 80, depending on the desired method. The firmware may also send a start signal indicating either an RSA operation or an ECC operation which may be correctly interpreted by the RSA APB module 78 or the ECC APB module 80. In other words, only one of the RSA APB module 78 and the ECC APB module 80 may be activated at a given time. The corresponding configurations may then be selected/loaded.

Figure 5:
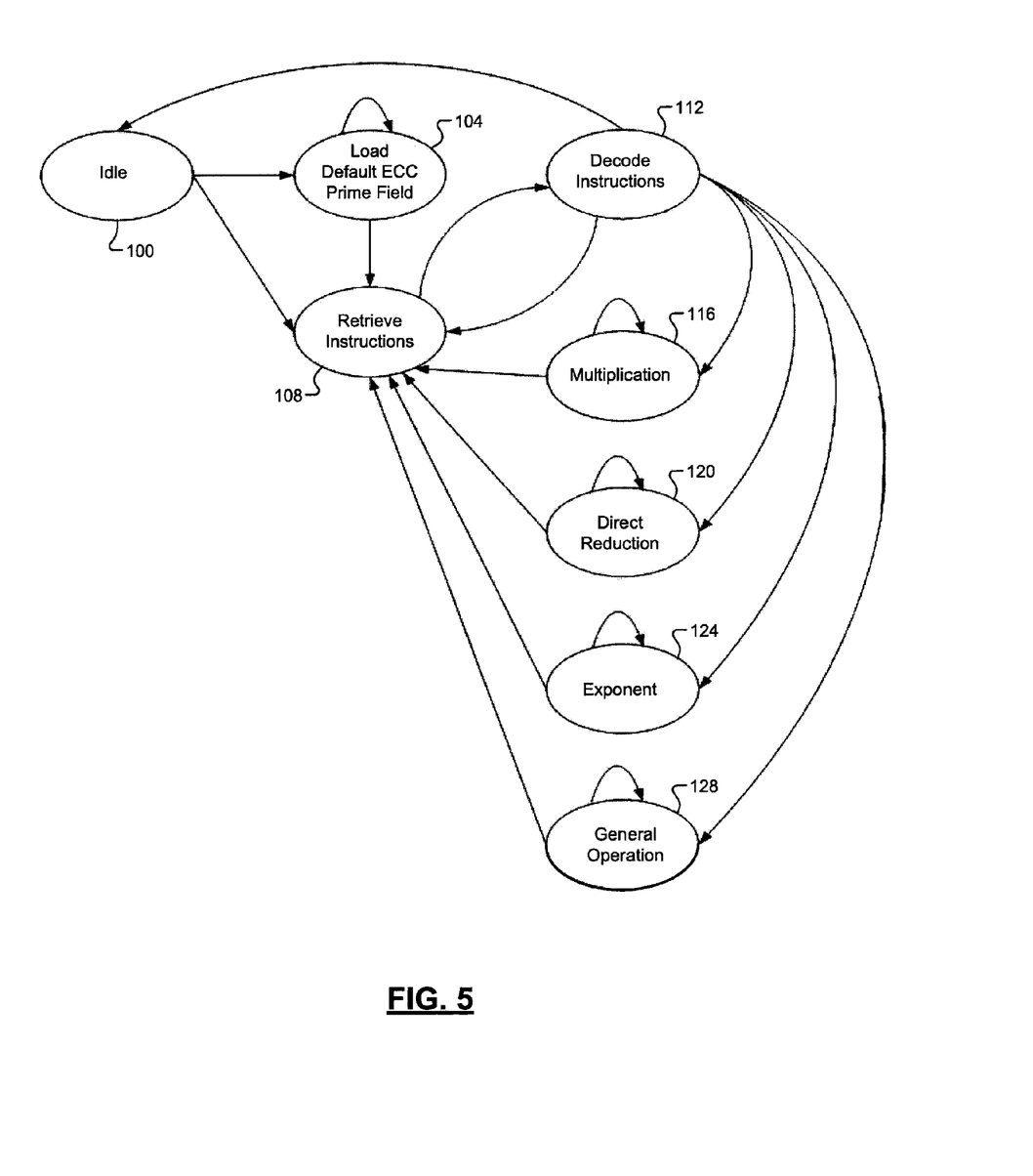
FIG. 5 is a state diagram illustrating the various operational states of a processing module according to one implementation of the present disclosure.

Referring now to FIG. 5, an example of a state diagram is shown illustrating operation of the central processing module 40 or more specifically of the processing module 60. At 100, the processing module 60 is idle. After all required operands have been loaded to the RAM 32, the CPU 33 (firmware) may start the operation by asserting the start bit through the corresponding APB interface. When start signal is triggered, the PC is loaded with an initial value indicating the starting instruction of an operation according to the configuration. At 104, the user may choose to use a default ECC prime field built into the combination RSA-ECC module 30. For example, the processing module 60 may activate the general operation module 70 to load the default ECC prime field to the RAM 32. At 108, after the ECC prime field is loaded or if the user chooses not to load the ECC prime field, the processing module 60 may retrieve instructions from the instruction module 62 according to the PC value.

At 112, the processing module 60 may decode the retrieved instructions. The instruction's arguments may be used to set up configuration registers, such as source and destination addresses. When the decoded instructions can be performed within one cycle, the processing module 60 returns to 108. Otherwise, the processing module 60 may activate one of the four sub-modules of the computation module 42 by asserting the sub-module's start signal. Specifically, when the decoded instructions indicate a multiplication operation, the processing module 60 may proceed to 116. Alternatively, when the decoded instructions indicate a direct reduction operation, the processing module 60 may proceed to 120. Alternatively, when the decoded instructions indicate an exponent operation, the processing module may proceed to 124. Alternatively, when the decoded instructions indicate a general operation, the processing module may proceed to 128. The decoded instructions, however, may also indicate an end of a current operation in which case the processing module 60 may return to idle at 100.

At 116, the multiplier module 64 may perform a Montgomery multiplication operation. At 120, the direct reduction module 66 may perform a direct reduction operation. At 124, the exponent module 68 may perform an exponent operation. At 128, the general operation module 70 may perform a general operation. The processing module 60 may receive a done signal when the task is completed in state 116, 120, 124, or 128. The processing module 60 may then return to 108.

Figure 6:
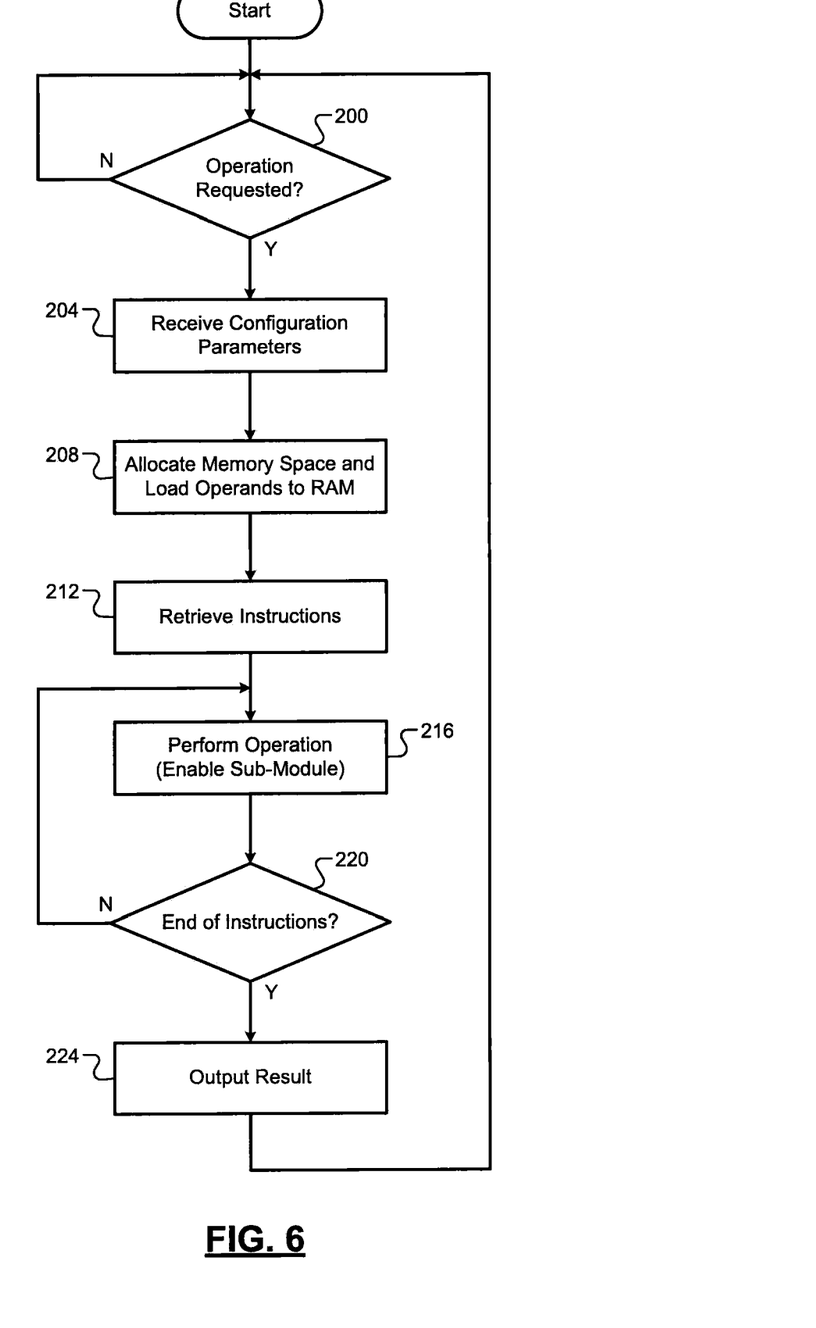
FIG. 6 is a flow diagram of a method for combination RSA-ECC cryptography according to one implementation of the present disclosure.

Referring now to FIG. 6, an example method for combination RSA-ECC cryptography begins at 200. At 200, the combination RSA-ECC module 30 determines whether an RSA or ECC operation is requested by a user. If true, control may proceed to 204. If false, control may return to 200. At 204, the RSA APB module 78 and the ECC APB module 80 receive configuration data for the RSA or ECC operation. For example, the configuration data may include the operand size.

At 208, the address offset module 72 allocates memory space and loads operands to the RAM 32. The CPU 33 (firmware) may load the operands through RSA APB module 78 or ECC APB module 80. APB operand mapping module 74 may map loaded operands to specified memory locations in RAM 32 according to the addresses generated by the address offset module 72. For example, the address offset module 72 may apply address offsets and the APB operand mapping module 74 may then map the operands to the RAM 32. At 212, the processing module 60 retrieves instructions for the RSA or ECC operation from the instruction module 62. At 216, the processing module 60 enables a sub-module of the computation module 42 based on a current instruction. For example, the processing module 60 may enable the multiplier module 64 to perform Montgomery multiplication on target operands in the RAM 32.

At 220, the processing module 60 determines whether an end of the instructions has been reached. If true, control may proceed to 224. If false, control may return to 216. At 224, the computation result is read from the RAM 32 to the CPU 33 (firmware) through APB operand mapping module 74 and RSA APB module 78 or ECC APB module 80. For example, the result may indicate whether an operand input by the user was authenticated. Control may then return to 200.

The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A system, comprising:
an interface circuit configured to
   (i) receive operands and configuration data for a Rivest-Shamir-Adleman (RSA) operation or an Elliptic Curve Cryptography (ECC) operation, and
   (ii) control access to a random access memory (RAM) for storage of the operands, wherein the RAM is external to the system;
an addressing circuit configured to
   determine whether the operands correspond to an RSA operation or an ECC operation,
   determine, based on the determination of whether the operands correspond to an RSA operation or an ECC operation, respective sizes of the operands,
   allocate, based on the respective sizes of the operands, memory space within the RAM for storage of the operands, wherein allocating the memory space within the RAM includes (i) generating a set of addresses based on the respective sizes of the operands indicated by the determination and (ii) mapping the operands to the memory space within the RAM based on the set of addresses such that memory space within the system is mapped to the memory space within the RAM external to the system; and
a multiplier circuit including a Montgomery multiplier configured to perform Montgomery multiplication operation for both the RSA operation and the ECC operation using the operands mapped to the memory space within the RAM.

2. The system of claim 1, further comprising:
an instruction circuit configured to store a plurality of instructions for performing (i) the RSA operation or (ii) the ECC operation; and
a processing circuit configured to retrieve instructions from the instruction circuit and to execute the instructions by enabling one of a plurality of computation circuits.

3. The system of claim 2, wherein the plurality of computation circuits includes the multiplier circuit.

4. The system of claim 2, wherein the plurality of computation circuits includes a direct reduction circuit configured to perform direct reduction operations.

5. The system of claim 2, wherein the plurality of computation circuits includes an exponent circuit configured to perform at least one of a plurality of exponential operations including (i) modular inverse and (ii) modular exponentiation.

6. The system of claim 5, wherein the exponent circuit is configured to at least one of (i) determine a location of a leading one-bit to determine a length of an exponent operand and (ii) left-shift a target operand by one bit.

7. The system of claim 2, wherein the plurality of computation circuits includes a general operation circuit configured to perform at least one of a plurality of general operations including (i) modular addition or subtraction on two operands, (ii) constant addition or constant subtraction on one operand, (iii) setting an operand to a predetermined value, (iv) moving an operand from a first memory location to a second memory location, and (v) determining whether an operand is zero.

8. The system of claim 2, wherein each of the plurality of computation circuits shares a similar interface and performs a predefined task, and wherein the plurality of computation circuits are further configured for at least one of (i) addition of one or more computation circuits to the plurality of computation circuits and (ii) removal of one or more computation circuits from the plurality of computation circuits.

9. The system of claim 1, wherein the addressing circuit is configured to apply an address offset for mapping of the operands to compensate for a smaller range of operand sizes for the ECC operation compared to the RSA operation.

10. The system of claim 9, wherein the range of operand sizes for the ECC operation is 234-bit to 521-bit and the range of operand sizes for the RSA operation is 32-bit to 2048-bit.

11. The system of claim 9, further comprising an operand mapping circuit configured to map the operands for storage within the RAM based on the address offset.

12. A method for operating a Montgomery multiplier system, the method comprising:
receiving operands and configuration data for a Rivest-Shamir-Adleman (RSA) operation or an Elliptic Curve Cryptography (ECC) operation;
determining whether the operands correspond to an RSA operation or an ECC operation;
determining, based on the determination of whether the operands correspond to an RSA operation or an ECC operation, respective sizes of the operands;
allocating, based on the respective sizes of the operands, memory space within an external random access memory (RAM) for storage of the operands, wherein allocating the memory space within the external RAM includes (i) generating a set of addresses based on the respective sizes of the operands indicated by the determination and (ii) mapping the operands to the memory space within the external RAM based on the set of addresses; and
performing, with a single Montgomery multiplier, Montgomery multiplication operation for both the RSA operation and the ECC operation using the operands mapped to the memory space within the RAM such that memory space within the Montgomery multiplier system is mapped to the memory space within the RAM external to the system.

13. The method of claim 12, further comprising:
storing a plurality of instructions for performing (i) the RSA operation or (ii) the ECC operation;
retrieving instructions from the stored plurality of instructions; and
executing the retrieved instructions.

14. The method of claim 13, wherein executing the retrieved instructions includes performing at least one of (1) a Montgomery multiplication operation, (2) a direct reduction operation, (3) an exponential operation, and (4) a general operation, wherein the exponential operation includes modular inverse or modular exponentiation, and wherein the general operation includes one of (i) modular addition or module subtraction on two operands, (ii) constant addition or constant subtraction on one operand, (iii) setting an operand to a predetermined value, (iv) moving an operand from a first memory location to a second memory location, and (v) determining whether an operand is zero.

15. The method of claim 14, wherein executing the retrieved instructions further includes at least one of (i) determining a location of a leading one-bit to determine a length of an exponent operand and (ii) left-shifting a target operand by one bit.

16. The method of claim 14, further comprising at least one of (i) adding additional operations that are performable when executing the retrieved instructions and (ii) removing existing operations that are performable when executing the retrieved instructions.

17. The method of claim 12, further comprising applying an address offset for mapping of the operands to compensate for a smaller range of operand sizes for the ECC operation compared to the RSA operation.

18. The method of claim 17, wherein the range of operand sizes for the ECC operation is 234-bit to 521-bit and the range of operand sizes for the RSA operation is 32-bit to 2048-bit.

19. The method of claim 17, further comprising mapping the operands for storage within the RAM based on the address offset.

* * * * *